US009299127B2

(12) United States Patent
Pekofsky et al.

(10) Patent No.: US 9,299,127 B2
(45) Date of Patent: Mar. 29, 2016

(54) SPLITTING OF ELLIPTICAL IMAGES

(71) Applicant: 6115187 Canada, Montreal (CA)

(72) Inventors: Gregory Pekofsky, Dollard-des-Ormeaux (CA); Dongxu Li, Pointe-Clare (CA); Guillaume Racine, Granby (CA)

(73) Assignee: ImmerVision, Montreal (CA)

( * ) Notice: Subject to any disclaimer, the term of this patent is extended or adjusted under 35 U.S.C. 154(b) by 100 days.

(21) Appl. No.: 13/950,559

(22) Filed: Jul. 25, 2013

(65) Prior Publication Data

US 2014/0085303 A1   Mar. 27, 2014

Related U.S. Application Data

(60) Provisional application No. 61/704,060, filed on Sep. 21, 2012.

(51) Int. Cl.
*G09G 5/00* (2006.01)
*G06T 3/00* (2006.01)
*G06T 15/04* (2011.01)

(52) U.S. Cl.
CPC .............. *G06T 3/0087* (2013.01); *G06T 3/005* (2013.01); *G06T 15/04* (2013.01)

(58) Field of Classification Search
CPC ........ G06T 3/0087; G06T 3/005; G06T 15/04
USPC ................................................ 345/582–588
See application file for complete search history.

(56) References Cited

U.S. PATENT DOCUMENTS

| | | | | |
|---|---|---|---|---|
| 6,859,557 | B1 * | 2/2005 | Uyttendaele et al. | 382/235 |
| 7,158,138 | B1 * | 1/2007 | Bronskill et al. | 345/441 |
| 7,843,461 | B2 * | 11/2010 | Takashima et al. | 345/582 |
| 2003/0117411 | A1 * | 6/2003 | Fujiwara et al. | 345/582 |
| 2003/0195883 | A1 * | 10/2003 | Mojsilovic et al. | 707/6 |
| 2004/0174373 | A1 * | 9/2004 | Stevens et al. | 345/582 |
| 2005/0237337 | A1 * | 10/2005 | Leather et al. | 345/582 |
| 2006/0017741 | A1 * | 1/2006 | Sekine et al. | 345/582 |
| 2006/0210160 | A1 * | 9/2006 | Cardenas et al. | 382/173 |
| 2012/0294516 | A1 * | 11/2012 | Lee et al. | 382/162 |

OTHER PUBLICATIONS

Silverman et al., "Bayesian Clustering for Unsupervised Estimation of Surface and Texture Models", IEEE Transactions on Pattern Analysis and Machine Intelligence, vol. IO. No. 4. Jul. 1988, 482-495.*

* cited by examiner

*Primary Examiner* — Jacinta M Crawford
*Assistant Examiner* — Robert Craddock
(74) *Attorney, Agent, or Firm* — Panitch Schwarze Belisario & Nadel LLP

(57) ABSTRACT

A method of splitting of elliptical images performed by a processor is provided. The method includes: receiving an image whose pixels span a range along each of two orthogonal axes; segmenting the image into indexed sub-images; storing the sub-images as texture maps; responding to a request for a value of a texture element having S1, T1 and H coordinates by returning the value of the texture element of the sub-image indexed by H whose X and Y coordinates are S1 and T1.

12 Claims, 9 Drawing Sheets

Figure 6

```
Algorithm 1 One example algorithm to split image in one direction
//m is the maximum texture size of a specific GPU
//returns an array of segmentation positions
array function splitSize(int l)
step := m
position := 0
if( non-POT is supported) then
    flag := true
else
    flag := false
endif
array segPos
while(position < l) {
    add position to segPos
    while(position + step > l) {
        if(flag) then
            step = l - position
        else
            step = step/2
        endif
    }
}
return segPos
```

Figure 8

```
Algorithm 2 One example algorithm to construct TauDome from split
elliptic image
void TauDome(){
    for(int tile=0;tile<number_of_tiles;tile++)
    TauDomeTile(tile)
}
//i is integer for the i-th rectangular sub-image
//d is an integer which defines the mesh triangle sizes
void function TauDomeTile(int i) {
    W :=width of the elliptic image
    H :=height of the elliptic image
    w :=width of i-th sub-image
    h :=height of i-th sub-image
    l :=left edge of i-th sub-image
    u :=top of i-th sub-image
    for(int j=0;j<d;j++) {
        for(int k=0;k<d;j++) {
```

$$s = \frac{l+j/d}{W}$$

$$t = \frac{u+j/d}{H}$$

```
            add texture coordinates (s,t)
```

$$s = s - 0.5$$
$$t = t - 0.5$$
$$r_E = \sqrt{s^2 + t^2}$$
$$\varphi_E = \text{atan2}(t,s)$$
$$\theta = f^{-1}(r_E)$$
$$\varphi = \varphi_E$$

```
            add vertex coordinates (sin θ cos φ, sin θ sin φ, cos θ)
        }
    }
}
```

SPLITTING OF ELLIPTICAL IMAGES

REFERENCE TO RELATED APPLICATIONS

This application is a non-provisional of, and claims priority from, U.S. Provisional Patent Application US 61/704,060 entitled "SPLITTING OF ELLIPTICAL IMAGES" filed 21 Sep. 2012 the entirety of which is incorporated herein by reference.

FIELD

The subject matter relates to panoramic image processing and in particular to spliting of elliptical images.

SUMMARY

Direct environmental mapping by dome-based panorama viewers requires elliptic images to be loaded as textures. Due to the large sizes of elliptic images, they have to be split at loading time into sub-images which are in sizes acceptable to the GPU. Two device-dependent GPU limitations, maximum texture size and support for non-power-of-two(non-POT), should be considered in deciding the sub-image sizes. After the sub-images of proper sizes are generated, texture coordinates are assigned according to geometrical mapping of the panorama.

BRIEF DESCRIPTION OF THE DRAWINGS

The invention will be better understood by way of the following detailed description of embodiments of the invention with reference to the appended drawings, in which:

FIG. 2(*b*) is a schematic diagram illustrating a 2-D geometric mapping of a textured surface in accordance with the proposed solution;

FIG. 6 is an algorithmic listing illustrating image splitting in accordance with a non-limiting example of the proposed solution;

FIG. 8 is another algorithmic listing illustrating dome construction in accordance with another non-limiting example of the proposed solution.

DETAILED DESCRIPTION

To discuss texture mapping, several coordinate systems can be defined. Texture space is the 2-D space of surface textures and object space is the 3-D coordinate system in which 3-D geometry such as polygons and patches are defined. Typically, a polygon is defined by listing the object space coordinates of each of its vertices. For the classic form of texture mapping, texture coordinates (u, v) are assigned to each vertex. World space is a global coordinate system that is related to each object's local object space using 3-D modeling transformations (translations, rotations, and scales). 3-D screen space is the 3-D coordinate system of the display, a perspective space with pixel coordinates (x, y) and depth z (used for z-buffering). It is related to world space by the camera parameters (position, orientation, and field of view). Finally, 2-D screen space is the 2-D subset of 3-D screen space without z. Use of the phrase "screen space" by itself can mean 2-D screen space.

Figure 1:
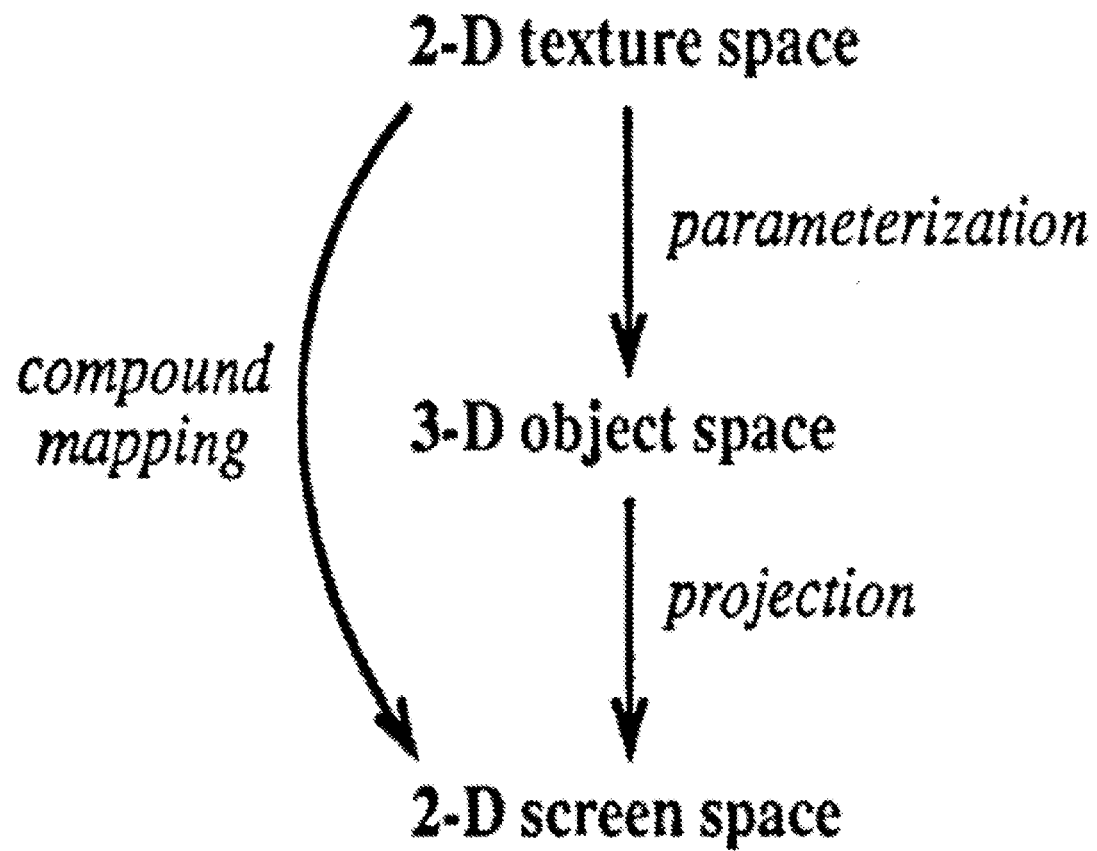
FIG. 1 is a schematic diagram illustrating relationships between spaces.
Figure 2A:
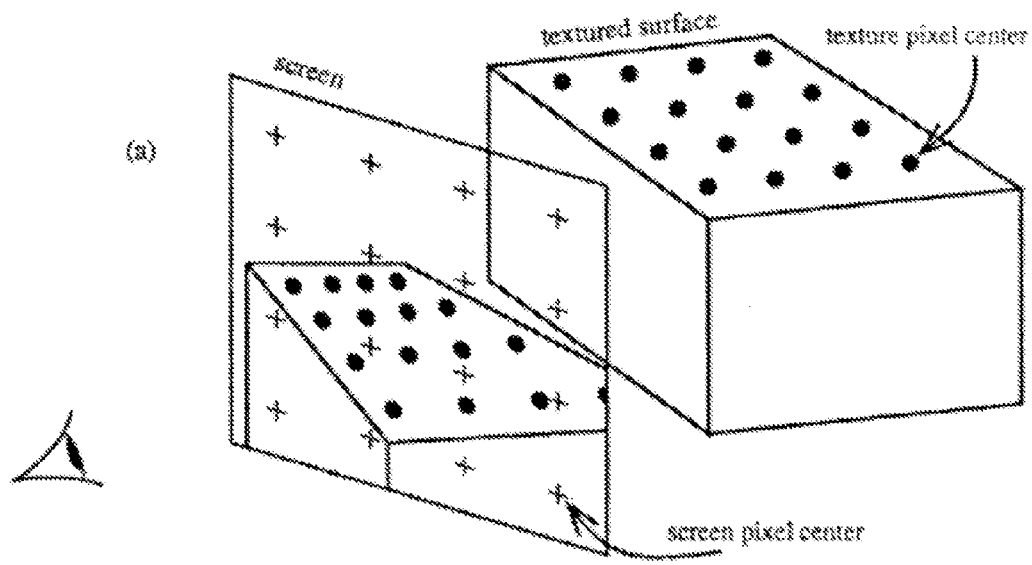
FIG. 2(*a*) is a schematic diagram illustrating rendering a view of a texture surface on a screen in accordance with the proposed solution.
Figure 2B:
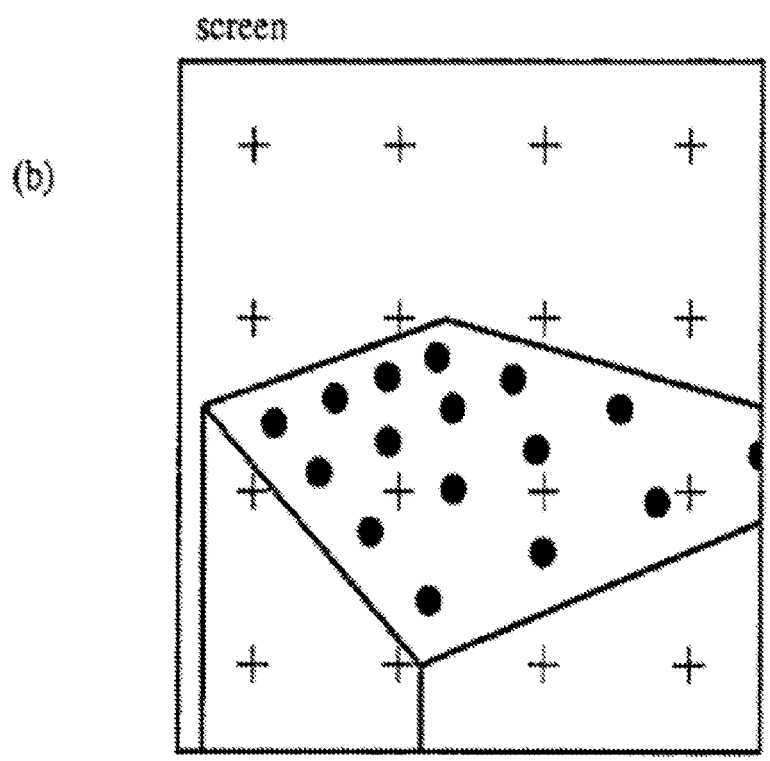

The correspondence between 2-D texture space and 3-D object space is called the parameterization of the surface, and the mapping from 3-D object space to 2-D screen space is the projection defined by the camera and the modeling transformations (FIG. 1). Note that when rendering a particular view of a textured surface (see FIG. 2(*a*)), it is the compound mapping from 2-D texture space to 2-D screen space that is of interest. For resampling purposes, once the 2-D to 2-D compound mapping is known, the intermediate 3-D space can be ignored. The compound mapping in texture mapping is an example of an image warp, the resampling of a source image to produce a destination image according to a 2-D geometric mapping (see FIG. 2(*b*)).

Figure 3:
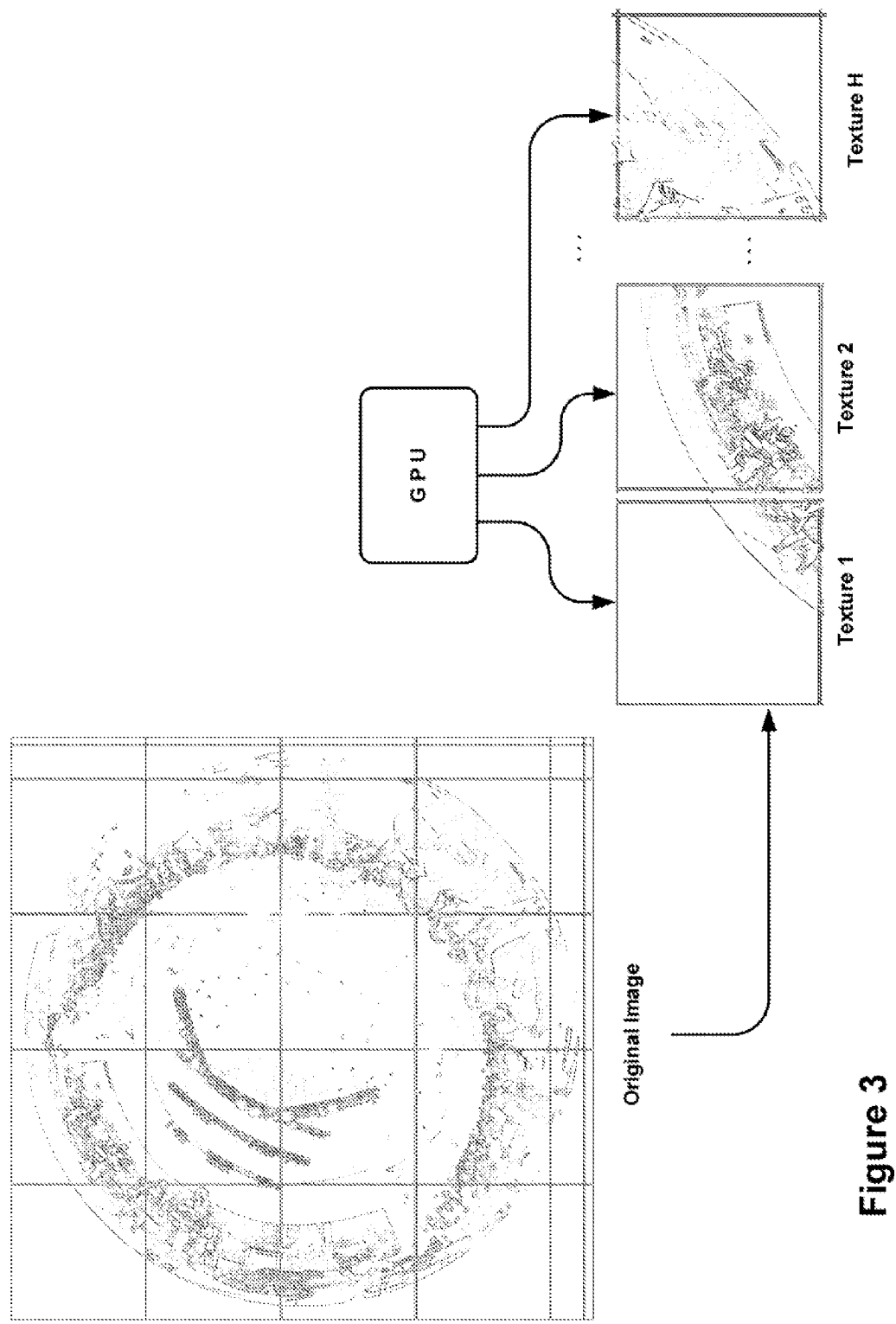
FIG. 3 is schematic diagram illustrating sub-images loaded as textures in accordance with the proposed solution.

In one embodiment, at loading time, the width and height of an original panoramic image (e.g., elliptic, which can include circular) are both split into segments of sizes up the maximum texture size of the GPU. When non-POT (non-power-of-two) is supported, there is at most one remainder segment with size less than the maximum texture size. Where non-POT is not supported, this remainder segment must be further split into POT sizes. The elliptic image is thus split into a plurality of rectangular sub-images according to segmentation in the width and height directions. The sub-images are loaded as textures (see FIG. 3).

In a further embodiment, the total memory of the GPU may be insufficient to accommodate the entire elliptical image. This may be the case on mobile devices. Thus, another benefit of using a splitting algorithm is to be able to load the high resolution elliptic panorama images for mobile devices with tight limits on system memory.

Figure 4:
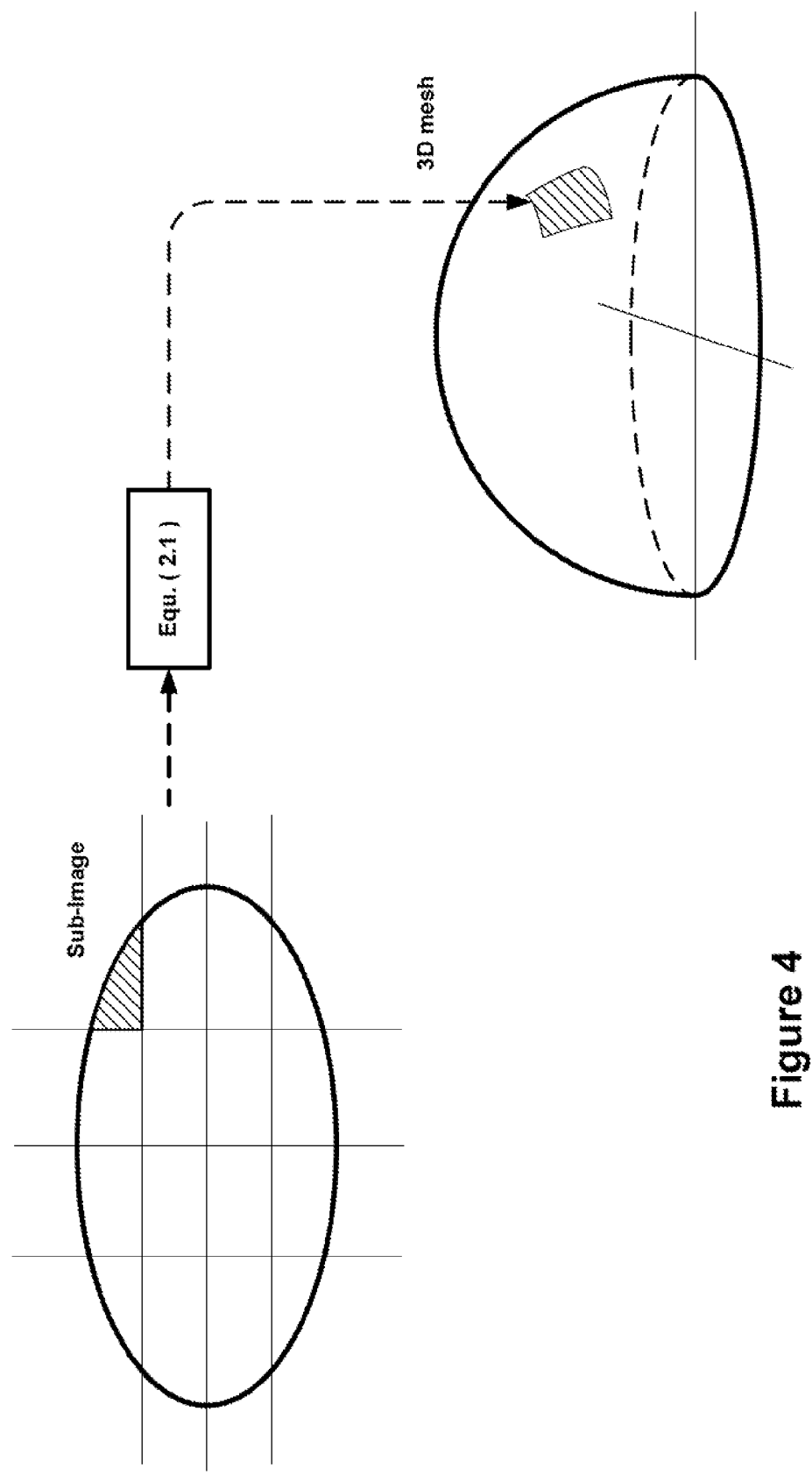
FIG. 4 is a schematic diagram illustrating determining vertex coordinates from texture coordinates in accordance with the proposed solution.

One 3-D mesh portion is created to cover each rectangular sub-image, and the vertex coordinates are determined from the texture coordinates of the elliptic image, $$\begin{cases} \theta = f^{-1}(r_E) \\ \varphi = \Theta_E \end{cases} \quad (2.1)$$

where $r_E$ and $\Theta_E$ are the texture coordinates in polar coordinates, and $f^{-1}(r_E)$ is the reverse mapping function from elliptic image to panorama defined by the camera lens projection. This is shown in FIG. 4.

The texture coordinates of the elliptic image and texture coordinates of sub-images are related by linear scaling, as in the following equation:

$$\begin{cases} s_E = \dfrac{L_S + s_S W_S}{W_E} \\ t_E = \dfrac{T_S + t_S H_S}{H_E} \end{cases} \qquad (2.2)$$

where s and t are texture coordinates, and W and H stand for image width and height respectively, with subscripts E and S indicating elliptic and sub-image respectively, and LS and TS are the pixel location of the left and top edge of the sub-image, respectively.

Figure 5:
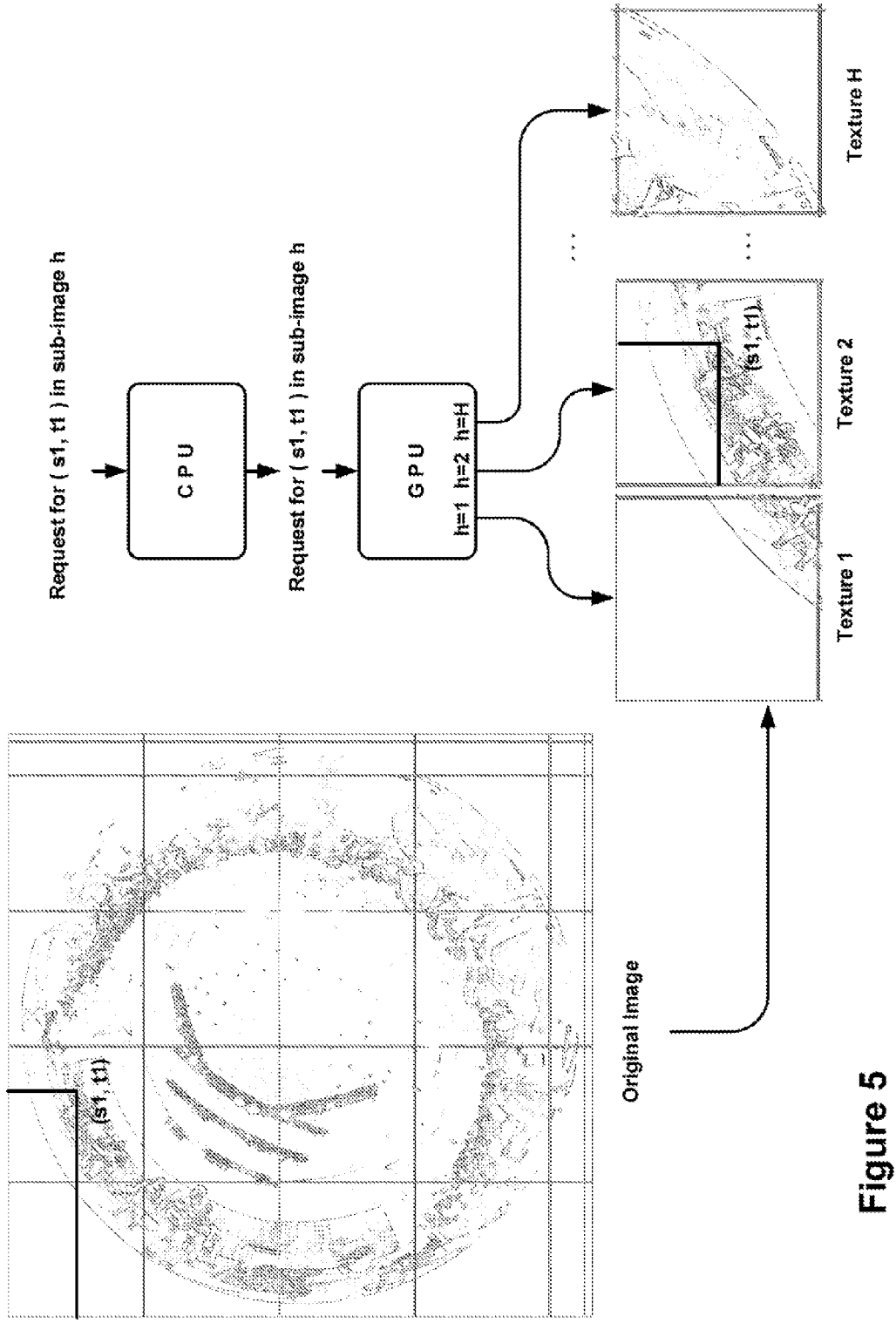
FIG. 5 is a schematic diagram illustrating obtaining texture values in accordance with the proposed solution.

As such, consider a vertex for which, by virtue of the texture map, is mapped to coordinates (s, t) in the original elliptical image. In order to obtain the texture value for (s, t), it is necessary for the central processing unit (CPU) to determine the sub-image corresponding to these coordinates and the location within that sub-image. This is obtained using Eq. (2.2) above, which will result in (s, t) for a given sub-image h, (1≤h≤H). The appropriate texture value can thus be obtained using the graphics processing unit (GPU) (see FIG. 5).

Figure 7:
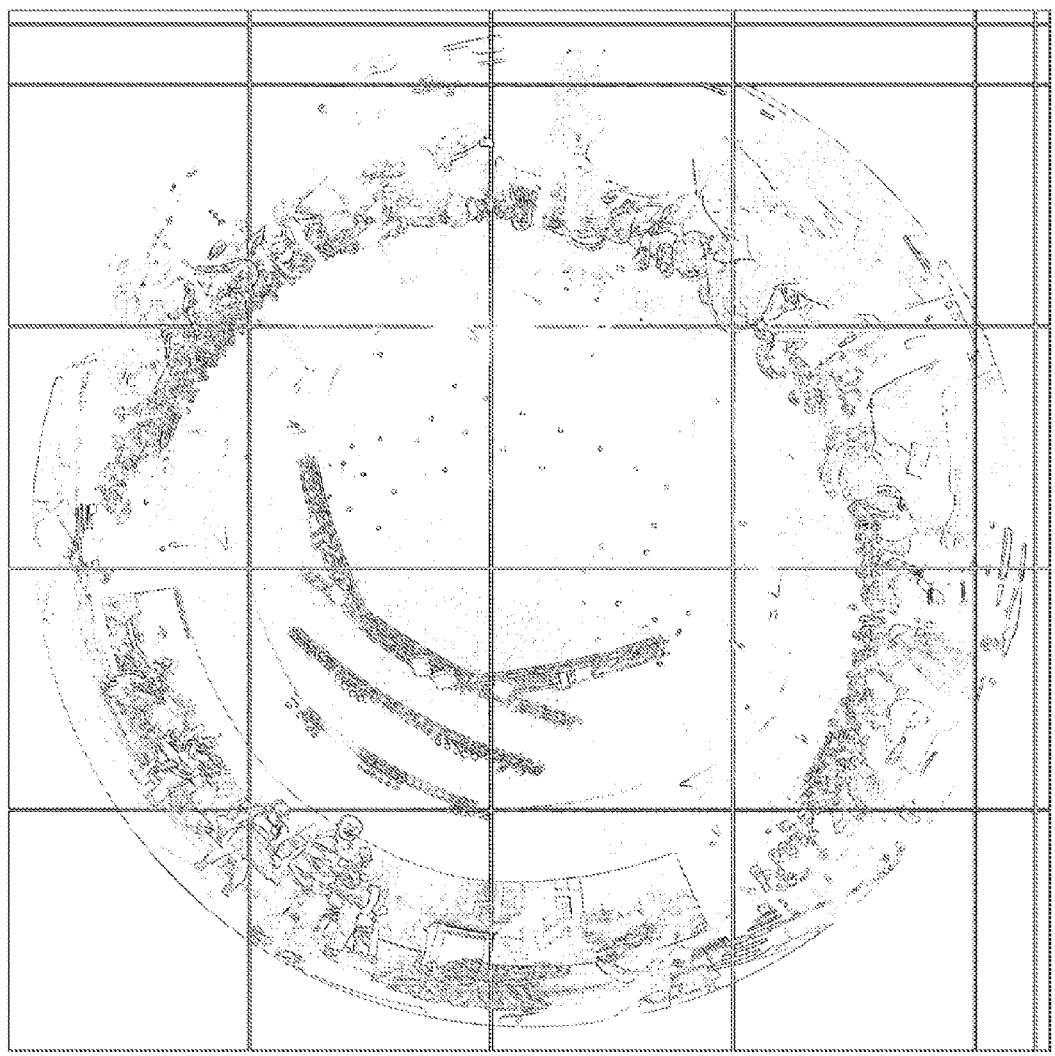
FIG. 7 is an illustration of a split elliptic panorama in accordance with the proposed solution.

A non-limiting example of image splitting according to width or height is given by Algorithm 1 in FIG. 6. FIG. 7 shows an example of splitting of an elliptic panorama. Specifically, splitting was done by power-of-two sizes up to a given maximum. Straight lines indicates borders of subimages after splitting.

Figure 9:
FIG. 9 is an illustration of a dome construction from a split elliptic image in accordance with the non-limiting algorithmic example illustrated in FIG. 8, wherein similar features bear similar labels throughout the drawings.

A non-limiting example of dome construction from a split elliptic image is given in Algorithm 2 in FIG. 8. FIG. 9 shows a dome with the split images mapped thereon. Specifically, mapping of an elliptic panorama split to power-of-two (POT) sizes up to a given maximum is illustrated by way of non-limiting example.

Those skilled in the art will appreciate that a computing device may implement the methods and processes of certain embodiments of the present invention by executing instructions read from a storage medium. In some embodiments, the storage medium may be implemented as a ROM, a CD, Hard Disk, USB, etc. connected directly to (or integrated with) the computing device. In other embodiments, the storage medium may be located elsewhere and accessed by the computing device via a data network such as the Internet. Where the computing device accesses the Internet, the physical interconnectivity of the computing device in order to gain access to the Internet is not material, and can be achieved via a variety of mechanisms, such as wireline, wireless (cellular, WI-FI, BLUETOOTH, WIMAX), fiber optic, free-space optical, infrared, etc. The computing device itself can take on just about any form, including a desktop computer, a laptop, a tablet, a smartphone (e.g., BLACKBERRY, IPHONE, etc.), a TV set, etc.

Moreover, persons skilled in the art will appreciate that in some cases, the panoramic image being processed may be an original panoramic image, while in other cases it may be an image derived from an original panoramic image, such as a thumbnail or preview image.

Certain adaptations and modifications of the described embodiments can be made. Therefore, the above discussed embodiments are to be considered illustrative and not restrictive. Also it should be appreciated that additional elements that may be needed for operation of certain embodiments of the present invention have not been described or illustrated as they are assumed to be within the purview of the person of ordinary skill in the art. Moreover, certain embodiments of the present invention may be free of, may lack and/or may function without any element that is not specifically disclosed herein.

What is claimed is:

1. A method performed by a GPU, comprising:
   receiving at the GPU, an image whose pixels span a range along each of two orthogonal axes;
   segmenting, by the GPU, the image into indexed sub-images;
   storing, by the GPU, the sub-images as texture maps;
   responding, by the GPU, to a request for a value of a texture element having S1, T1 and H coordinates by returning the value of the texture element of the sub-image indexed by H whose X and Y coordinates are S1 and T1.

2. The method defined in claim 1, wherein segmenting is done according to maximum GPU size.

3. The method defined in claim 1, wherein segmenting is done according to powers of two.

4. The method defined in claim 1, wherein the image is a panoramic image.

5. The method defined in claim 1, wherein the pixels of the image define an ellipse.

6. The method defined in claim 1, wherein the pixels of the image define an circle.

7. A method performed by a CPU, comprising:
   receiving at the CPU, a request for a value of a texture element having S and T coordinates;
   transforming, by the CPU, the S and T coordinates into S1, T1 and H coordinates, where S1 and T1 denote X and Y coordinates within a sub-texture indexed by H;
   sending, by the CPU, a request to a GPU for a value of a texture element having S1, T1 and H coordinates;
   receiving, by the CPU from the GPU, the value of the texture element of the sub-texture indexed by H whose X and Y coordinates are S1 and T1.

8. The method defined in claim 7, wherein the request is received from a requesting function, the method further comprising returning the received value of the texture element to the requesting function.

9. The method defined in claim 7, wherein the sub-texture is a sub-image obtained from an original image through segmentation.

10. The method defined in claim 9, wherein the original image is an elliptical panoramic image.

11. A non-transitory computer-readable medium comprising instructions which, when executed by a GPU, cause the GPU to carry out a method that comprises:
    receiving an image whose pixels span a range along each of two orthogonal axes;
    segmenting the image into indexed sub-images;
    storing the sub-images as texture maps;
    responding to a request for a value of a texture element having S1, T1 and H coordinates by returning the value of the texture element of the sub-image indexed by H whose X and Y coordinates are S1 and T1.

12. A non-transitory computer-readable medium comprising instructions which, when executed by a CPU, cause the CPU to carry out a method that comprises:
    receiving a request for a value of a texture element having S and T coordinates;
    transforming the S and T coordinates into S1, T1 and H coordinates, where S1 and T1 denote X and Y coordinates within a sub-texture indexed by H;
    sending a request to a GPU for a value of a texture element having S1, T1 and H coordinates;
    receiving from the GPU the value of the texture element of the sub-texture indexed by H whose X and Y coordinates are S1 and T1.

* * * * *